US012534036B2

(12) United States Patent
Uzuki et al.

(10) Patent No.: US 12,534,036 B2
(45) Date of Patent: Jan. 27, 2026

(54) MONITORING SYSTEM, MONITORING METHOD, INFORMATION PROCESSING APPARATUS, AND COMPUTER READABLE MEDIUM

(71) Applicant: NEC Corporation, Tokyo (JP)

(72) Inventors: Aoi Uzuki, Tokyo (JP); Hideyuki Shintani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/714,264

(22) PCT Filed: Dec. 16, 2021

(86) PCT No.: PCT/JP2021/046644
§ 371 (c)(1),
(2) Date: May 29, 2024

(87) PCT Pub. No.: WO2023/112286
PCT Pub. Date: Jun. 22, 2023

(65) Prior Publication Data
US 2025/0018892 A1 Jan. 16, 2025

(51) Int. Cl.
*B60R 21/0132* (2006.01)
*G06V 20/56* (2022.01)
(52) U.S. Cl.
CPC .......... *B60R 21/0132* (2013.01); *G06V 20/56* (2022.01); *B60W 2520/105* (2013.01)
(58) Field of Classification Search
None
See application file for complete search history.

(56) References Cited

U.S. PATENT DOCUMENTS

2021/0218875 A1* 7/2021 Saito ............... H04N 23/70
2022/0406189 A1* 12/2022 Kurehashi ............ H04W 4/12

FOREIGN PATENT DOCUMENTS

| JP | 2003-219412 A | 7/2003 |
| JP | 2004-224105 A | 8/2004 |
| JP | 6862596 B1 | 4/2021 |
| WO | 2016/132769 A1 | 8/2016 |
| WO | 2016/147581 A1 | 9/2016 |

OTHER PUBLICATIONS

International Search Report for PCT Application No. PCT/JP2021/046644, mailed on Mar. 1, 2022.

* cited by examiner

*Primary Examiner* — Samuel D Fereja
(74) *Attorney, Agent, or Firm* — Sughrue Mion, PLLC

(57) ABSTRACT

A monitoring system (1) including: a mounted apparatus (20) configured to be mounted on a first mobile body; and an information processing apparatus (10), in which the mounted apparatus includes an acceleration sensor, and the information processing apparatus includes: a specification unit (11) configured to specify, based on information measured by the acceleration sensor, an image capturing apparatus configured to capture an image of a second mobile body that has come into contact with the first mobile body; and an acquisition unit (12) configured to acquire the image captured by the image capturing apparatus that is specified by the specification unit.

6 Claims, 7 Drawing Sheets

| DIRECTION OF ACCELERATION DUE TO CONTACT | CONTACT PLACE IN FIRST MOBILE BODY | CONTACT PLACE IN SECOND MOBILE BODY | MAGNITUDE OF ACCELERATION DUE TO CONTACT | MOVING DIRECTION OF SECOND MOBILE BODY | MOVING SPEED OF SECOND MOBILE BODY WHEN IT HAS COME INTO CONTACT WITH FIRST MOBILE BODY |
|---|---|---|---|---|---|
| DIRECTION A | PLACE A1 | PLACE A2 | MAGNITUDE A3 | DIRECTION A51, A52, A53 | SPEED A7 |
| DIRECTION B | | | MAGNITUDE A4 | DIRECTION A61, A62, A63 | SPEED A8 |
| ⋮ | ⋮ | ⋮ | ⋮ | ⋮ | ⋮ |
| | | | | ⋮ | ⋮ |

Fig. 6

| IMAGE CAPTURING APPARATUS ID | INSTALLATION POSITION | INSTALLATION DIRECTION | ANGLE OF VIEW |
|---|---|---|---|
| IMAGE CAPTURING APPARATUS C | INSTALLATION POSITION C1 | INSTALLATION DIRECTION C2 | ANGLE OF VIEW C3 |
| IMAGE CAPTURING APPARATUS D | INSTALLATION POSITION D1 | INSTALLATION DIRECTION D2 | ANGLE OF VIEW D3 |
| ... | ... | ... | ... |

Fig. 7

MONITORING SYSTEM, MONITORING METHOD, INFORMATION PROCESSING APPARATUS, AND COMPUTER READABLE MEDIUM

This application is a National Stage Entry of PCT/JP2021/046644 filed on Dec. 16, 2021, the contents of all of which are incorporated herein by reference, in their entirety.

TECHNICAL FIELD

The present disclosure relates to a monitoring system, a monitoring method, an information processing apparatus, and a non-transitory computer readable medium storing a program.

BACKGROUND ART

Patent Literature 1 discloses that a video image captured by a front camera that captures an area in the direction to the front of a vehicle and a rear camera that captures an area in the direction to the rear of the vehicle are constantly recorded, and when an impact is detected by an impact detection sensor, the aforementioned recorded information is transferred to a storage memory and stored. According to Patent Literature 1, it is possible to provide a dashboard camera apparatus that can, in the event of an accident such as a hit-and-run accident, specify a vehicle that caused a hit-and-run accident.

CITATION LIST

Patent Literature

Patent Literature 1: Japanese Unexamined Patent Application Publication No. 2004-224105

SUMMARY OF INVENTION

Technical Problem

However, it is possible that the technology disclosed in Patent Literature 1 cannot sufficiently capture a video image of the vehicle that caused a hit-and-run accident. This is because a video image of the vehicle that caused a hit-and-run accident is captured by a camera of the vehicle.

In view of the above-described problem, an object of the present disclosure is to provide a monitoring system, a monitoring method, an information processing apparatus, and a non-transitory computer readable medium storing a program by which information about another vehicle or the like that has come into contact (collision) with a subject vehicle or the like can be appropriately acquired.

Solution to Problem

A first example aspect according to the present disclosure provides a monitoring system including: a mounted apparatus configured to be mounted on a first mobile body; and an information processing apparatus, in which the mounted apparatus includes an acceleration sensor, and the information processing apparatus includes: a specification unit configured to specify, based on information measured by the acceleration sensor, an image capturing apparatus configured to capture an image of a second mobile body that has come into contact with the first mobile body; and an acquisition unit configured to acquire the image captured by the image capturing apparatus that is specified by the specification unit.

Further, a second example aspect according to the present disclosure provides a monitoring method performed by a monitoring system including: a mounted apparatus configured to be mounted on a first mobile body; and an information processing apparatus, the monitoring method including: specifying, based on information measured by an acceleration sensor of the mounted apparatus, an image capturing apparatus configured to capture an image of a second mobile body that has come into contact with the first mobile body; and acquiring the image captured by the specified image capturing apparatus.

Further, a third example aspect according to the present disclosure provides an information processing apparatus including: a specification unit configured to specify, based on information measured by an acceleration sensor of a mounted apparatus configured to be mounted on a first mobile body, an image capturing apparatus configured to capture an image of a second mobile body that has come into contact with the first mobile body; and an acquisition unit configured to acquire the image captured by the image capturing apparatus that is specified by the specification unit.

Further, a fourth example aspect according to the present disclosure provides a non-transitory computer readable medium storing a program for causing a computer to: specify, based on information measured by an acceleration sensor of a mounted apparatus configured to be mounted on a first mobile body, an image capturing apparatus configured to capture an image of a second mobile body that has come into contact with the first mobile body; and acquire the image captured by the specified image capturing apparatus.

Advantageous Effects of Invention

According to one example aspect of the present disclosure, it is possible to appropriately acquire information about another vehicle or the like that has come into contact (collision) with a subject vehicle or the like.

BRIEF DESCRIPTION OF DRAWINGS

FIG. 6 is a diagram showing an example of information recorded in a contact DB according to an example embodiment; and FIG. 7 is a diagram showing an example of information recorded in an image capturing apparatus DB according to an example embodiment.

EXAMPLE EMBODIMENT

Example embodiments of the present invention will be described hereinafter with reference to the drawings.

First Example Embodiment

<Configuration>

Figure 1:
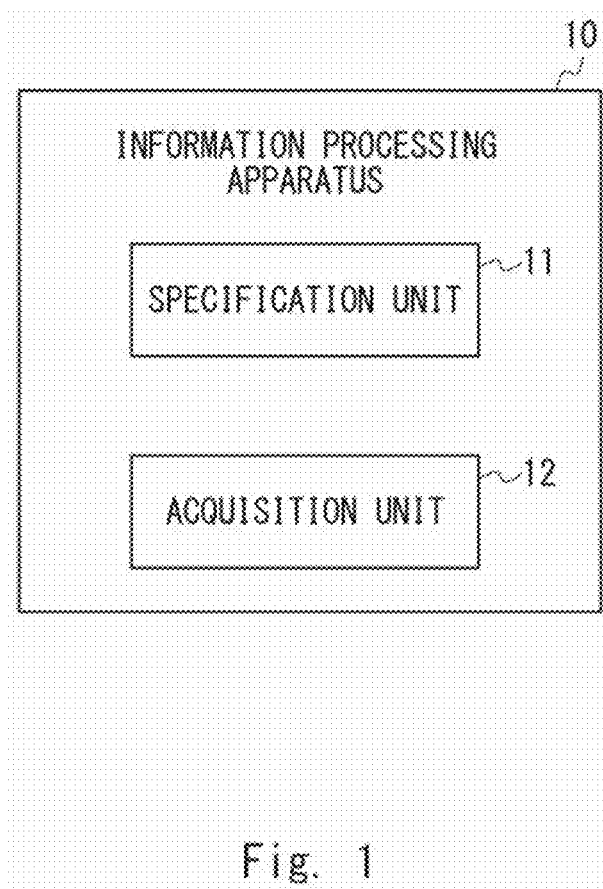
FIG. 1 is a diagram showing an example of a configuration of an information processing apparatus according to an example embodiment.

A configuration of an information processing apparatus 10 according to an example embodiment will be described with reference to FIG. 1. FIG. 1 is a diagram showing an example of the configuration of the information processing apparatus 10 according to the example embodiment. The information processing apparatus 10 includes a specification unit 11 and an acquisition unit 12. These units may be implemented by the cooperation of one or more programs installed in the information processing apparatus 10 and hardware such as a processor 101 and a memory 102 of the information processing apparatus 10.

The specification unit 11 specifies, for example, an image capturing apparatus which captures an image of a second mobile body that has come into contact with a first mobile body based on information measured by an acceleration sensor mounted on the first mobile body. The acquisition unit 12 acquires the image captured by the image capturing apparatus specified by the specification unit 11.

Second Example Embodiment

Next, a configuration of a monitoring system 1 according to an example embodiment will be described with reference to FIG. 2.

<System Configuration>

Figure 2:
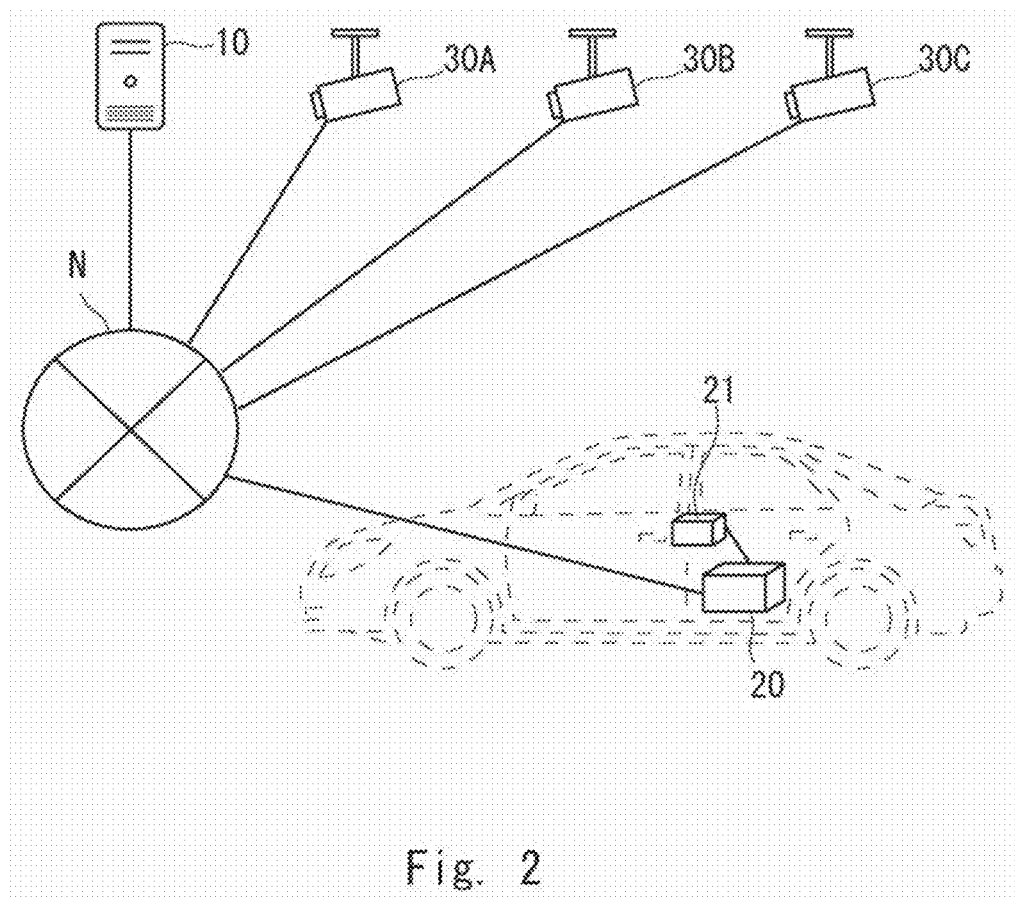
FIG. 2 is a diagram showing an example of a configuration of a monitoring system according to an example embodiment.

FIG. 2 is a diagram showing a configuration example of a monitoring system 1 according to the example embodiment. In the example shown in FIG. 2, the monitoring system 1 includes the information processing apparatus 10 and a mounted apparatus 20. The monitoring system 1 further includes an image capturing apparatus 30A, an image capturing apparatus 30B, and an image capturing apparatus 30C (hereinafter simply referred to as an "image capturing apparatus 30" when it is not necessary to distinguish them from each other).

The mounted apparatus 20 is, for example, an apparatus mounted on a mobile body such as a vehicle, an autonomous traveling robot, and a flying car (Electric Vertical Take-Off and Landing aircraft (eVTOL), Urban Air Mobility (UAM)). Note that examples of a vehicle according to the present disclosure include, but are not limited to, an automobile, a motorcycle, a motor-assisted bicycle, and a bicycle. The mounted apparatus 20 includes an acceleration sensor 21 inside or outside the housing of the mounted apparatus 20.

The image capturing apparatus 30 is, for example, an image capturing apparatus (a camera) provided in a place other than the mobile body on which the mounted apparatus 20 is mounted and installed so that it can capture an image of a road. In this case, the image capturing apparatus 30 may be, for example, an image capturing apparatus installed so that it can capture an image of a traveling route such as a road. In this case, the image capturing apparatus 30 may be, for example, attached to a pole (a signal pole) to which a traffic signal is attached, a pole to which a road sign or the like is attached, a street light, and a utility pole. Further, the image capturing apparatus 30 may be, for example, provided in a facility such as a store and a parking. Further, the image capturing apparatus 30 may be, for example, an image capturing apparatus mounted on a mobile body different from the first mobile body on which the mounted apparatus 20 is mounted. In this case, the image capturing apparatus 30 may be mounted, for example, on a police vehicle, a fire vehicle, a road maintenance work vehicle, a municipal vehicle, and a private passenger vehicle. Note that the number of the information processing apparatuses 10, the number of the mounted apparatuses 20, and the number of the image capturing apparatuses 30 are not limited to those shown in the example of FIG. 1.

The information processing apparatus 10, the mounted apparatus 20, and the image capturing apparatus 30 are connected to each other through a network N such as the Internet, a wireless Local Area Network (LAN), and a mobile phone network so that they can communicate with each other. The network N described in the present disclosure may include, for example, the fifth generation mobile communication system (5G, NR: New Radio), the fourth generation mobile communication system (4G), and the third generation mobile communication system (3G). Note that the 4G may include, for example, Long Term Evolution (LTE) Advanced, WiMAX2, and LTE. Further, the network N described in the present disclosure may include, for example, the sixth generation mobile communications system (6G, Beyond 5G). Further, the wireless communication described in the present disclosure may be performed in accordance with any generation of a known wireless communication protocol or a wireless communication protocol developed in the future.

<Hardware Configuration>

Figure 3:
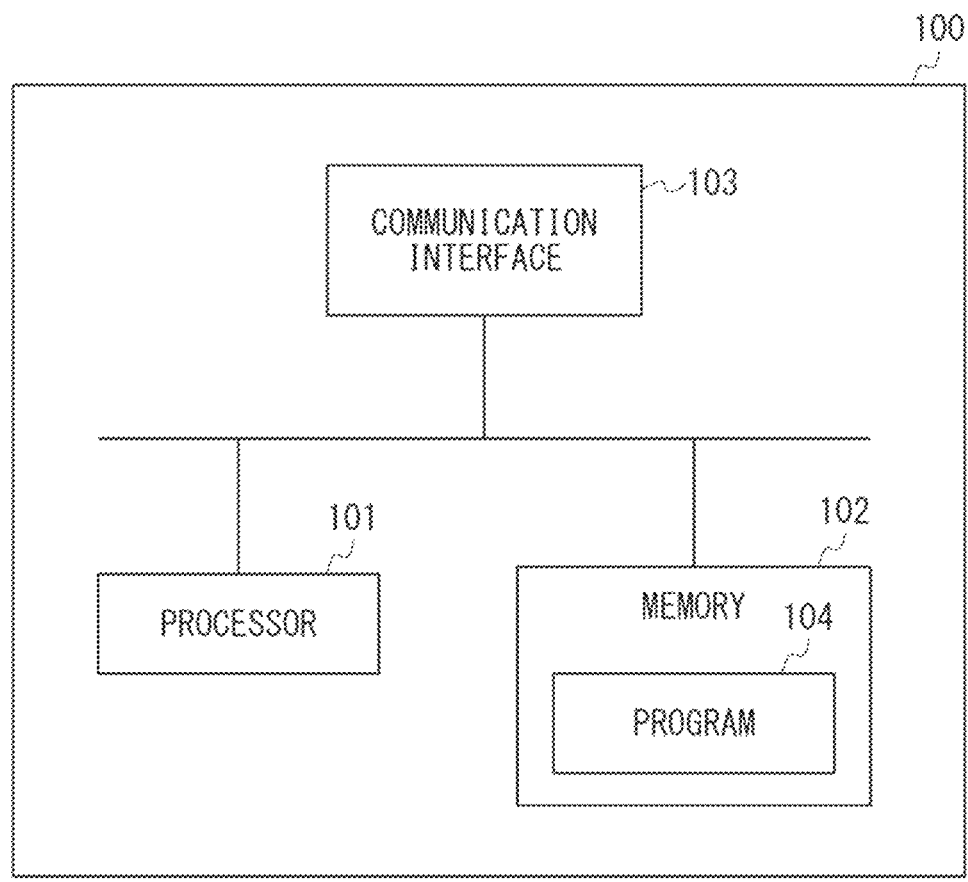
FIG. 3 is a diagram showing an example of a hardware configuration of the information processing apparatus and a mounted apparatus according to an example embodiment.

FIG. 3 is a diagram showing an example of a hardware configuration of each of the information processing apparatus 10 and the mounted apparatus 20 according to the example embodiment. The information processing apparatus 10 will be described below as an example, and the hardware configuration of the mounted apparatus 20 may be similar to that of the information processing apparatus 10. In the example shown in FIG. 3, the information processing apparatus 10 (a computer 100) includes the processor 101, the memory 102, and a communication interface 103. These components may be connected to each other by a bus or the like. The memory 102 stores at least a part of a program 104. The communication interface 103 includes an interface required for communication with other network elements.

When the program 104 is executed by cooperation of the processor 101, the memory 102 and the like, the computer 100 performs at least some of the processes of the example embodiments of the present disclosure. The memory 102 may be of any type suitable for a local technical network. The memory 102 may, as a non-limiting example, be a non-transitory computer readable storage medium. Further, the memory 102 may be implemented using any suitable data storage technology, such as a semiconductor-based memory device, a magnetic memory device and system, an optical memory device and system, a fixed memory, and a removable memory. Although only one memory 102 is shown in the computer 100, the computer 100 may include several memory modules that are physically different from each other. The processor 101 may be of any type. The processor 101 may include one or more of a general-purpose computer, a dedicated computer, a microprocessor, a Digital Signal Processor (DSP), and a processor based on a multi-core processor architecture as a non-limiting example. The computer 100 may include a plurality of processors, such as an application-specific integrated circuit chip that is temporally dependent on a clock that synchronizes the main processor.

The example embodiments of the present disclosure may be implemented in hardware or a dedicated circuit, software, logic, or any combination thereof. Some example aspects may be implemented in hardware, while other example aspects may be implemented in firmware or software that may be executed by a controller, a microprocessor, or other computing devices.

The present disclosure also provides at least one computer program product that is tangibly stored in a non-transitory computer readable storage medium. The computer program product includes computer executable instructions, such as instructions included in program modules, and is executed on a device on a target real or virtual processor to perform the processes or the method according to the present disclosure. The program modules include routines, programs, libraries, objects, classes, components, data structures, and the like that perform specific tasks or implement specific abstract data types. The functions of the program modules may be combined or divided among the program modules as desired in various example embodiments. Machine executable instructions for the program modules can be executed in a local or a distributed device. In a distributed device, program modules can be located in both local and remote storage media.

Program codes for performing the method according to the present disclosure may be written in any combination of one or more programming languages. These program codes are provided to a processor or a controller of a general-purpose computer, a dedicated computer, or other programmable data processing apparatuses. When the program codes are executed by the processor or the controller, functions/operations in the flowchart and/or a block diagram to be implemented are executed. The program codes are executed entirely on a machine, partly on a machine, as a stand-alone software package, partly on a machine, partly on a remote machine, or entirely on a remote machine or a server.

The program can be stored and provided to a computer using any type of non-transitory computer readable media. Non-transitory computer readable media include any type of tangible storage media. Examples of non-transitory computer readable media include magnetic storage media, optical magnetic storage media, optical disc media, semiconductor memories, and the like. Magnetic storage media include, for example, flexible disks, magnetic tapes, hard disk drives, and the like. Optical magnetic storage media include, for example, magneto-optical disks and the like. Optical disk media include, for example, a Blu-ray disc, a Compact Disc (CD)-Read Only Memory (ROM), a CD-Recordable (R), a CD-ReWritable (RW), and the like. Semiconductor memories include, for example, a mask ROM, a Programmable ROM (PROM), an Erasable PROM (EPROM), a flash ROM, a random access memory (RAM), and the like. The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires and optical fibers) or a wireless communication line.

<Processing>

Figure 4:
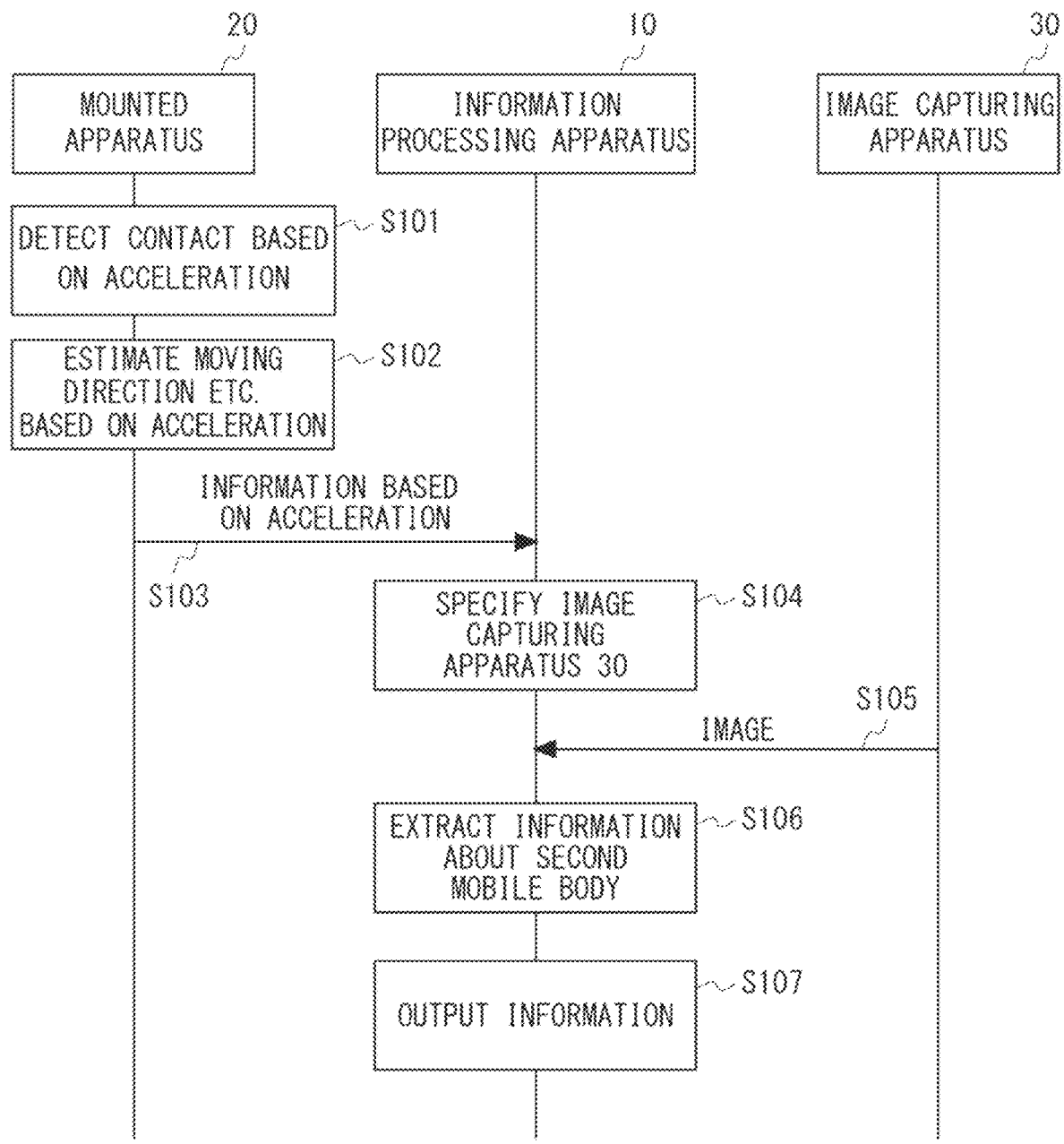
FIG. 4 is a sequence diagram showing an example of processes performed by the monitoring system according to an example embodiment.
Figure 5:
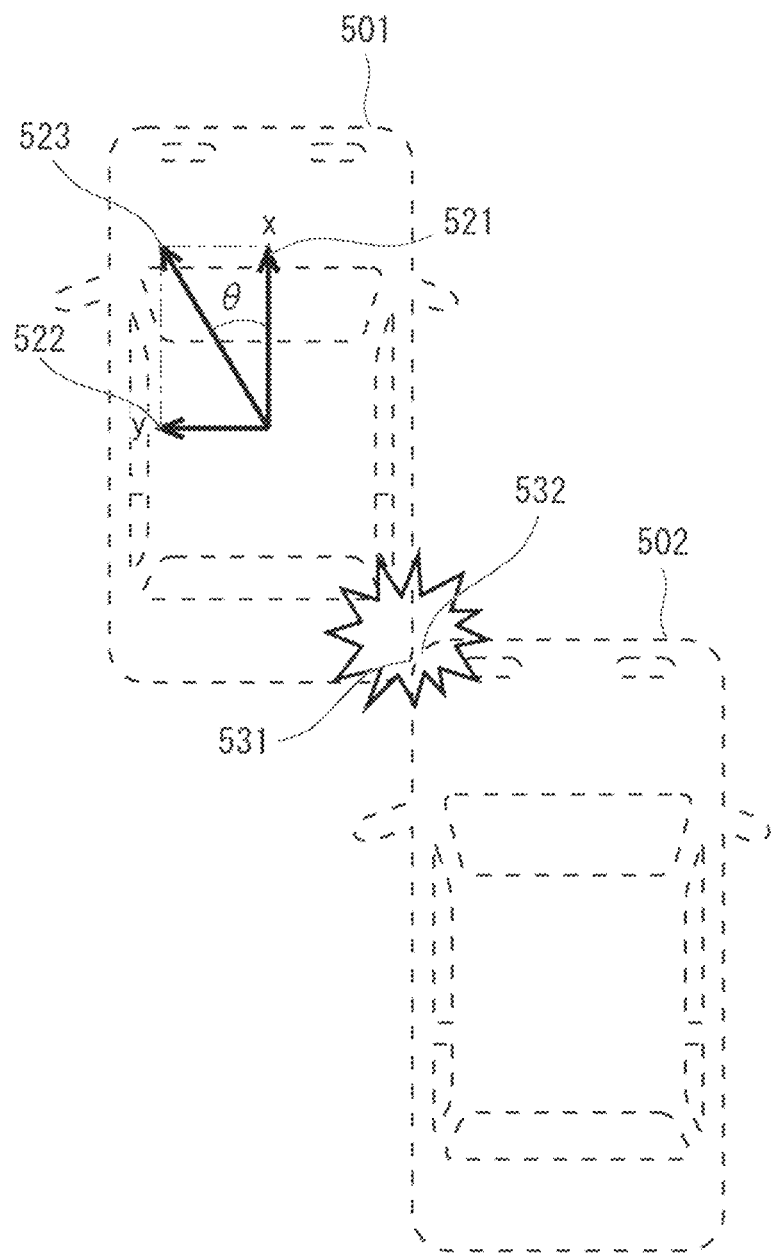
FIG. 5 is a diagram showing an example of acceleration and the like of a first mobile body when a second mobile body has come into contact with the first mobile body according to an example embodiment.

An example of processes performed by the monitoring system 1 according to the example embodiment will be described with reference to FIGS. 4 to 7. FIG. 4 is a sequence diagram showing an example of processes performed by the monitoring system 1 according to the example embodiment. FIG. 5 is a diagram showing an example of acceleration and the like of a first mobile body when a second mobile body has come into contact with the first mobile body according to the example embodiment. FIG. 6 is a diagram showing an example of information recorded in a contact DB 601 according to the example embodiment. FIG. 7 is a diagram showing an example of information recorded in an image capturing apparatus DB 701 according to the example embodiment. Note that the following processes may be performed when the first mobile body on which the mounted apparatus 20 is mounted is stopped (standing still) or when the first mobile body is moving (traveling).

In Step S101, the mounted apparatus 20 detects that another object (the second mobile body) has come into contact with the first mobile body on which the mounted apparatus 20 is mounted by the acceleration sensor 21. Note that, for example, as shown in FIG. 5, a center 511 of a first mobile body 501 in a horizontal plane may be used as the origin. Further, in a case in which a front direction of the first mobile body (a normal traveling direction) is set as an x-axis and the direction perpendicular to the x-axis is set as a y-axis, the mounted apparatus 20 may detect that the second mobile body has come into contact with the first mobile body based on the acceleration in the x-axis direction and in the y-axis direction. In this case, for example, the mounted apparatus 20 may calculate a vector 523 indicating acceleration of the first mobile body due to its contact with the second mobile body by adding (combining) a vector 521 of the acceleration in the x-axis direction to (with) a vector 522 of the acceleration in the y-axis direction. When the size (the length) of the vector 523 is equal to or greater than a threshold, the mounted apparatus 20 may determine that a second mobile body 502 has come into contact with the first mobile body. Note that FIG. 5 shows an example of a contact place (a damaged place) 531 in the first mobile body (a subject mobile body, e.g., a subject vehicle) where it has come into contact with the second mobile body and an example of a contact place 532 in the second mobile body where it has come into contact with the first mobile body.

Next, the mounted apparatus 20 estimates various types of information based on the acceleration and the like of the first mobile body measured by the acceleration sensor 21 when the second mobile body has come into contact with the first mobile body (Step S102). Here, the mounted apparatus 20 may refer to the contact DB 601 shown in FIG. 6 and then estimate various types of information based on the acceleration of the first mobile body when the second mobile body has come into contact with the first mobile body. Note that the contact DB 601 may be stored (set, registered) in advance in a storage apparatus inside or outside the mounted apparatus 20. In this case, information corresponding to the type (e.g., the type of the vehicle) or the size of the first mobile body on which the mounted apparatus 20 is mounted may be registered in the contact DB 601 from a user or the like.

Alternatively, information to be stored in the contact DB 601 may be calculated by the mounted apparatus 20 based on the information input from a user or the like. In this case, the mounted apparatus 20 may receive an input of information about the shape and the size of the first mobile body and a position in the first mobile body where the acceleration sensor 21 is installed, calculate various types of information based on the input information, and store the calculated information in the contact DB 601.

In the example shown in FIG. 6, the contact DB 601 associates the contact place in the first mobile body and an estimated contact place in the second mobile body with the direction of the acceleration of the first mobile body due to its contact with the second mobile body and stores them. Thus, for example, when another vehicle has come into contact with the right side of the front surface (the front part) of the first mobile body, which is the subject vehicle, it is possible to register that the estimated contact place in the second mobile body, which is the other vehicle, is the left side of the front surface of the second mobile body.

Further, in the example shown in FIG. 6, the contact DB 601 associates one or more estimated moving directions of the second mobile body (e.g., the directions in which the second mobile body moves as viewed from the first mobile body) and estimated moving speeds (traveling speeds) of the second mobile body when it has come into contact with the first mobile body with the direction of the acceleration of the first mobile body due to its contact with the second mobile body and the magnitude of the acceleration of the first mobile body due to its contact with the second mobile body, and stores them. Thus, for example, when another vehicle has come into contact with the front surface (the front part) of the first mobile body, which is the subject vehicle, at an acceleration equal to or less than a first threshold, it can be estimated that the second mobile body, which is the other vehicle, will keep moving (will drive away, will hit-and-run) forward (toward the rear of the subject vehicle), forward to the left (toward the right rear of the subject vehicle), or forward to the right (toward the left rear of the subject vehicle). Further, for example, when another vehicle has come into contact with the front surface of the first mobile body at an acceleration larger than or equal to a second threshold, which is larger than the first threshold, it can be estimated that the second mobile body will move in a direction of a left turn (in the right rear direction as viewed from the subject vehicle) or a direction such as a U-turn (toward the front of the subject vehicle). Further, for example, when another vehicle has come into contact with the rear surface (the rear part) of the first mobile body at an acceleration equal to or less than a third threshold, it can be estimated that the second mobile body will keep moving forward (toward the front of the subject vehicle), forward to the left, or forward to the right. Further, for example, when another vehicle has come into contact with the rear surface (the rear part) of the first mobile body at an acceleration larger than or equal to a fourth threshold, which is larger than the third threshold, it can be estimated that the second mobile body move in a direction such as a left turn or a U-turn. Note that when a plurality of estimated moving directions in which the second mobile body moves are registered, the estimated moving speed of the second mobile body when the second mobile body has come into contact with the first mobile body may be stored (registered) for each estimated moving direction.

Further, the mounted apparatus 20 may acquire information indicating a feature value of the second mobile body based on the acceleration of the first mobile body measured by the acceleration sensor 21 when the second mobile body has come into contact with the first mobile body. In this case, the mounted apparatus 20 may, for example, activate a camera corresponding to the contact place in the first mobile body measured (estimated) based on the acceleration of the first mobile body when the second mobile body has come into contact with the first mobile body among a plurality of cameras mounted on the first mobile body to capture an image of the second mobile body. Further, the mounted apparatus 20 may, for example, control the panning (the orientation of the camera in the horizontal direction) for making the camera mounted on the first mobile body face in a direction corresponding to the contact place in the first mobile body measured (estimated) based on the acceleration of the first mobile body when the second mobile body has come into contact with the first mobile body to capture an image of the second mobile body. Then, the mounted apparatus 20 may extract information such as the color, the shape, and the type of the vehicle based on the captured image using artificial intelligence (AI) or the like.

Next, the mounted apparatus 20 transmits the information and the like estimated based on, for example, the acceleration of the first mobile body when the second mobile body has come into contact with the first mobile body to the information processing apparatus 10 (Step S103). Here, the mounted apparatus 20 may transmit information such as identification information of the first mobile body, the current position of the first mobile body, the orientation of the first mobile body, information indicating a feature value of the second mobile body, the time when the first and the second mobile bodies have come into contact with each other, the contact place in the second mobile body, the magnitude of the acceleration of the first mobile body due to its contact with the second mobile body, the direction in which the second mobile body moves, and the moving speed of the second mobile body when it has come into contact with the first mobile body to the information processing apparatus 10. Note that the mounted apparatus 20 may acquire current position information of the first mobile body using, for example, a satellite positioning system such as a Global Positioning System (GPS). Further, the mounted apparatus 20 may measure the orientation of the first mobile body (the forward orientation of the first mobile body) using, for example, an azimuth sensor.

Next, the specification unit 11 of the information processing apparatus 10 specifies the image capturing apparatus 30 for capturing an image of the second mobile body that has come into contact with the first mobile body based on the acceleration of the first mobile body when the second mobile body has come into contact with the first mobile body (Step S104). Here, the information processing apparatus 10 may estimate the position of the second mobile body at each time point (time) based on the received information about the current position of the first mobile body, the orientation of the first mobile body, the contact place in the second mobile body, and the direction in which the second mobile body moves, and map data (an example of "information about roads near the first mobile body") recorded in advance. Note that the map data may include position information of each place included in the road area.

Then, the acquisition unit 12 of the information processing apparatus 10 may refer to the image capturing apparatus DB 701 shown in FIG. 7 and then specify the image capturing apparatus 30 corresponding to the position of the second mobile body at each time point. Note that the image capturing apparatus DB 701 may be stored (set, registered) in advance in a storage apparatus inside or outside the information processing apparatus 10. Further, the information processing apparatus 10 may receive, from a mobile body, information about the current position and orientation of the image capturing apparatus 30 mounted on the mobile body at an appropriate timing (e.g., periodically) by radio communication or the like, and update the information in the image capturing apparatus DB 701. In the example shown in FIG. 7, information about an installation position, an installation direction, and an angle of view are associated with an image capturing apparatus ID and recorded in the image capturing apparatus DB 701. The image capturing apparatus ID is identification information of the image capturing apparatus 30. The installation position is information (e.g., latitude, longitude) indicating the position where the image capturing apparatus 30 is installed or the current position of the image capturing apparatus 30 mounted on the mobile body. The installation direction is information indicating the direction in which the image capturing apparatus 30 is installed or the current orientation of the image capturing apparatus 30 mounted on the mobile body. The installation direction may be, for example, a direction toward the center position of an image to be captured by the image capturing apparatus 30 as viewed from the image capturing apparatus 30. The angle of view is, for example, a horizontal (lateral) angle of view of an image to be captured by the image capturing apparatus 30.

The information processing apparatus 10 may first calculate, for example, an elapsed time from the time when the first and the second mobile bodies have come into contact with each other to a specific time. Further, the information processing apparatus 10 may, for example, estimate a range where the second mobile body is located at the specific time based on the calculated elapsed time and the direction in which the second mobile body moves estimated by the mounted apparatus 20. Further, the information processing apparatus 10 may, for example, specify the image capturing apparatus 30 that can capture an image of the estimated range where the second mobile body is located.

Next, the information processing apparatus 10 acquires the image (at least one of the moving image and the still image) captured by the specified image capturing apparatus 30 (Step S105). Here, the information processing apparatus 10 may, for example, transmit a command to the image capturing apparatus 30 for making the image capturing apparatus 30 transmit the captured image to the information processing apparatus 10 in real time. Alternatively, the information processing apparatus 10 may acquire the image from the storage apparatus that records the image captured by the image capturing apparatus 30.

Next, the information processing apparatus 10 extracts, based on the acquired image, information about the second mobile body that has come into contact with the first mobile body on which the mounted apparatus 20 is mounted (Step S106). By doing so, for example, information about another vehicle or the like that has come into contact (collision) with a subject vehicle or the like can be appropriately acquired. Note that the information processing apparatus 10 may, for example, read letters and numbers from the license plate (the vehicle registration plate) image of the second mobile body by the AI or the like.

Further, the information processing apparatus 10 may specify (estimate) an area in the image captured by the specified image capturing apparatus 30 where the second mobile body is included based on the acceleration of the first mobile body when the second mobile body has come into contact with the first mobile body, map data, and the time when the first and the second mobile bodies have come into contact with each other. In this case, the information processing apparatus 10 may first calculate, for example, an elapsed time from the time when the first and the second mobile bodies have come into contact with each other to a specific time. Further, the information processing apparatus 10 may specify, for example, an area in the image captured at the specified time where the second mobile body is included based on the calculated elapsed time, the direction in which the second mobile body moves, the moving speed of the second mobile body when it has come into contact with the first mobile body, and the position and the direction in which the image capturing apparatus 30 is installed. By doing so, for example, it is possible to more appropriately detect another vehicle or the like that has come into contact with a subject vehicle or the like. In this case, for example, the information processing apparatus 10 may estimate, as a position of the second mobile body at the specified time, a place to which the second mobile body will move in the direction in which the second mobile body moves by a distance calculated by multiplying the moving speed of the second mobile body when it has come into contact with the first mobile body and the above elapsed time. Further, the information processing apparatus 10 may, for example, convert the estimated position in two dimensions in the horizontal direction into coordinates on an image captured by the image capturing apparatus 30, thereby specifying an area in the image where the second mobile body is included.

Further, the information processing apparatus 10 may extract information indicating a feature of the second mobile body from the image captured by the image capturing apparatus 30 based on the contact place in the second mobile body estimated in accordance with the acceleration of the first mobile body when the second mobile body has come into contact with the first mobile body and the magnitude of the damage. By doing so, for example, it is possible to more appropriately detect another vehicle or the like that has come into contact with a subject vehicle or the like. In this case, the information processing apparatus 10 may, for example, estimate the magnitude of the damage in the second mobile body by the AI or the like based on the contact place in the second mobile body and the magnitude of the acceleration of the first mobile body due to its contact with the second mobile body measured by the acceleration sensor. Then, the information processing apparatus 10 may, for example, recognize each mobile body in the image captured by the image capturing apparatus 30 as an object, and detect a mobile body having a damage of the estimated size at the contact place as the second mobile body from among the recognized mobile bodies.

Next, the information processing apparatus 10 outputs the extracted information (Step S107). Here, the information processing apparatus 10 may, for example, transmit information about the second mobile body to a user of the first mobile body, an insurer contracted by the user of the first mobile body, a mail address of the police or the like. In this case, the information processing apparatus 10 may, for example, associate identification information of the first mobile body with information such as the mail address of the transmission destination and store them in advance. Further, the information processing apparatus 10 may, for example, display information about the second mobile body on a display apparatus (a display) or the like included in the information processing apparatus 10.

Modified Example

Each functional unit of the information processing apparatus 10 may be implemented, for example, by cloud computing composed of one or more computers. The information processing apparatus 10 and at least one of the mounted apparatus 20 and the image capturing apparatus 30 may be configured as an integrated information processing apparatus. Further, at least some of processes executed by the mounted apparatus 20 may be executed by the information processing apparatus 10. Further, at least some of processes executed by the information processing apparatus 10 may be executed by at least one of the mounted apparatus 20 and the image capturing apparatus 30.

Note that the present invention is not limited to the above-described example embodiments and may be changed as appropriate without departing from the scope and spirit of the present invention.

The whole or part of the example embodiments disclosed above can be described as, but not limited to, the following supplementary notes.

(Supplementary Note 1)

A monitoring system comprising: a mounted apparatus configured to be mounted on a first mobile body; and an information processing apparatus, wherein
the mounted apparatus comprises an acceleration sensor, and
the information processing apparatus comprises:
a specification unit configured to specify, based on information measured by the acceleration sensor, an image capturing apparatus configured to capture an image of a second mobile body that has come into contact with the first mobile body; and
an acquisition unit configured to acquire the image captured by the image capturing apparatus that is specified by the specification unit.

(Supplementary Note 2)

The monitoring system according to supplementary note 1, wherein the specification unit specifies the image capturing apparatus installed so as to be able to capture an image of a traveling route, or the image capturing apparatus mounted on a mobile body that is different from the first mobile body.

(Supplementary Note 3)

The monitoring system according to supplementary note 1 or 2, wherein the specification unit specifies the image capturing apparatus based on the information measured by the acceleration sensor and information about a road near the first mobile body.

(Supplementary Note 4)

The monitoring system according to any one of supplementary notes 1 to 3, wherein the specification unit specifies the image capturing apparatus based on the information measured by the acceleration sensor, the information about a road near the first mobile body, and the time when the first and the second mobile bodies have come into contact with each other.

(Supplementary Note 5)

The monitoring system according to any one of supplementary notes 1 to 4, wherein the specification unit specifies an area in the image captured by the image capturing apparatus where the second mobile body is included based on the information measured by the acceleration sensor, the information about a road near the first mobile body, and the time when the first and the second mobile bodies have come into contact with each other.

(Supplementary Note 6)

The monitoring system according to any one of supplementary notes 1 to 5, wherein the specification unit extracts information indicating a feature of the second mobile body from the image captured by the image capturing apparatus based on a contact place in the second mobile body where the second mobile body has come into contact with the first mobile body and a magnitude of damage in the second mobile body estimated in accordance with the information measured by the acceleration sensor.

(Supplementary Note 7)

A monitoring method performed by a monitoring system comprising: a mounted apparatus configured to be mounted on a first mobile body; and an information processing apparatus, the monitoring method comprising:
specifying, based on information measured by an acceleration sensor of the mounted apparatus, an image capturing apparatus configured to capture an image of a second mobile body that has come into contact with the first mobile body; and
acquiring the image captured by the specified image capturing apparatus.

(Supplementary Note 8)

An information processing apparatus comprising:
a specification unit configured to specify, based on information measured by an acceleration sensor of a mounted apparatus configured to be mounted on a first mobile body, an image capturing apparatus configured to capture an image of a second mobile body that has come into contact with the first mobile body; and
an acquisition unit configured to acquire the image captured by the image capturing apparatus that is specified by the specification unit.

(Supplementary Note 9)

The information processing apparatus according to supplementary note 8, wherein the specification unit specifies the image capturing apparatus provided outside the first mobile body.

(Supplementary Note 10)

A non-transitory computer readable medium storing a program for causing a computer to:
specify, based on information measured by an acceleration sensor of a mounted apparatus configured to be mounted on a first mobile body, an image capturing apparatus configured to capture an image of a second mobile body that has come into contact with the first mobile body; and
acquire the image captured by the specified image capturing apparatus.

REFERENCE SIGNS LIST

1 MONITORING SYSTEM
10 INFORMATION PROCESSING APPARATUS
11 SPECIFICATION UNIT
12 ACQUISITION UNIT
20 MOUNTED APPARATUS
30 IMAGE CAPTURING APPARATUS

What is claimed is:

1. A monitoring system comprising:
a mounted apparatus configured to be mounted on a first mobile body; and
an information processing apparatus, wherein:
the mounted apparatus comprises an acceleration sensor, and
the information processing apparatus comprises:
at least one memory storing instructions, instructions; and
at least one processor configured to execute the instructions to:
specify, based on information measured by the acceleration sensor, an image capturing apparatus configured to capture an image of a second mobile body that has come into contact with the first mobile body; and
acquire the image captured by the specified image capturing, and
wherein the at least one processor is configured to, based on the information measured by the acceleration sensor, information about a road near the first mobile body, and a time when the first and the second mobile bodies have come into contact with each other, perform at least one of: specifying the image capturing apparatus; or specifying an area in the image captured by the image capturing apparatus where the second mobile body is included.

2. The monitoring system according to claim 1, wherein the at least one processor is configured to specify the image capturing apparatus installed so as to be able to capture an image of a traveling route, or the image capturing apparatus mounted on a mobile body that is different from the first mobile body.

3. The monitoring system according to claim 1, wherein the at least one processor is configured to extract information indicating a feature of the second mobile body from the image captured by the image capturing apparatus based on a contact place in the second mobile body where the second mobile body has come into contact with the first mobile body and a magnitude of damage in the second mobile body estimated in accordance with the information measured by the acceleration sensor.

4. A monitoring method performed by a monitoring system comprising: a mounted apparatus configured to be mounted on a first mobile body; and an information processing apparatus, the monitoring method comprising:
   specifying, based on information measured by an acceleration sensor of the mounted apparatus, an image capturing apparatus configured to capture an image of a second mobile body that has come into contact with the first mobile body; and
   acquiring the image captured by the specified image capturing,
   based on the information measured by the acceleration sensor, information about a road near the first mobile body, and a time when the first and the second mobile bodies have come into contact with each other, perform at least one of: specifying the image capturing apparatus; or specifying an area in the image captured by the image capturing apparatus where the second mobile body is included.

5. An information processing apparatus comprising:
   at least one memory storing instructions; and
   at least one processor configured to execute the instructions to;
   specify, based on information measured by an acceleration sensor of a mounted apparatus configured to be mounted on a first mobile body, an image capturing apparatus configured to capture an image of a second mobile body that has come into contact with the first mobile body; and
   acquire the image captured by the specified image capturing,
   wherein the at least one processor is configured to, based on the information measured by the acceleration sensor, information about a road near the first mobile body, and a time when the first and the second mobile bodies have come into contact with each other, perform at least one of: specifying the image capturing apparatus; or specifying an area in the image captured by the image capturing apparatus where the second mobile body is included.

6. The information processing apparatus according to claim 5, wherein the at least one processor is configured to specify the image capturing apparatus provided outside the first mobile body.

* * * * *